(12) United States Patent
Zhang et al.

(10) Patent No.: US 11,745,226 B2
(45) Date of Patent: Sep. 5, 2023

(54) CELL PHOTOGRAPHING AND CONVEYING APPARATUS

(71) Applicant: GUANGZHOU SUPERSONIC AUTOMATION TECHNOLOGY CO., LTD., Guangzhou (CN)

(72) Inventors: Junfeng Zhang, Guangzhou (CN); Changchun Ye, Guangzhou (CN)

(73) Assignee: GUANGZHOU SUPERSONIC AUTOMATION TECHNOLOGY CO., LTD., Guangzhou (CN)

( * ) Notice: Subject to any disclaimer, the term of this patent is extended or adjusted under 35 U.S.C. 154(b) by 504 days.

(21) Appl. No.: 16/993,297

(22) Filed: Aug. 14, 2020

(65) Prior Publication Data
US 2020/0368787 A1  Nov. 26, 2020

Related U.S. Application Data

(63) Continuation of application No. PCT/CN2019/072774, filed on Jan. 23, 2019.

(30) Foreign Application Priority Data

Sep. 30, 2018 (CN) .......................... 201811160522.2

(51) Int. Cl.
*B65G 47/90* (2006.01)
*H01M 10/42* (2006.01)
(Continued)

(52) U.S. Cl.
CPC .............. *B07C 5/36* (2013.01); *B07C 5/3422* (2013.01); *B65G 15/28* (2013.01); *B65G 47/82* (2013.01);
(Continued)

(58) Field of Classification Search
CPC ......... B07C 5/36; B07C 5/3422; B65G 47/82; B65G 47/8876; B65G 47/91; H01M 10/4207
(Continued)

(56) References Cited

FOREIGN PATENT DOCUMENTS

| CN | 201497798 U | * | 6/2010 | ............. G01R 31/36 |
| CN | 103575682 A | * | 2/2014 | ............. G01N 21/33 |

(Continued)

OTHER PUBLICATIONS

International Search Report issued in corresponding international application No. PCT/CN2019/072774, dated Jul. 3, 2019(4 pages).
(Continued)

*Primary Examiner* — Prasad V Gokhale
*Assistant Examiner* — Molly K Devine (57) ABSTRACT

The present invention discloses a cell photographing and conveying apparatus, including a cell feeding workstation, a detection workstation, a manipulator and an image acquisition device. The manipulator transfers a cell from the cell feeding workstation to the detection workstation. The image acquisition device includes ultraviolet lamps, illumination lamps, and cameras, where the ultraviolet lamps are used for emitting ultraviolet light to the detection workstation. By means of the cell photographing and conveying apparatus, a relatively complete appearance image of the cell can be acquired, thus ensuring detection accuracy.

10 Claims, 8 Drawing Sheets

(51) Int. Cl.
    B07C 5/36    (2006.01)
    B07C 5/342   (2006.01)
    B65G 15/28   (2006.01)
    B65G 47/82   (2006.01)
    B65G 47/88   (2006.01)
    B65G 47/91   (2006.01)

(52) U.S. Cl.
    CPC ......... *B65G 47/8876* (2013.01); *B65G 47/91* (2013.01); *H01M 10/4207* (2013.01); *B65G 2203/0208* (2013.01); *B65G 2203/041* (2013.01)

(58) Field of Classification Search
    USPC ........................................................ 209/577
    See application file for complete search history.

(56) References Cited

FOREIGN PATENT DOCUMENTS

| | | | | | |
|---|---|---|---|---|---|
| CN | 105182242 | A | * | 12/2015 | ......... G01R 31/3865 |
| CN | 108188043 | A | * | 6/2018 | ........... B07C 5/3422 |
| CN | 108568410 | A | * | 9/2018 | ............... B07C 5/36 |
| CN | 109239069 | A | | 1/2019 | |
| CN | 109239070 | A | | 1/2019 | |
| CN | 109250470 | A | | 1/2019 | |
| CN | 109279333 | A | | 1/2019 | |
| JP | 2000090958 | A | | 3/2000 | |

OTHER PUBLICATIONS

Written opinion of International Search Authority issued in corresponding international application No. PCT/CN2019/072774, dated Jul. 3, 2019(5 pages).

* cited by examiner

CELL PHOTOGRAPHING AND CONVEYING APPARATUS

CROSS REFERENCE OF RELATED APPLICATIONS

The present application is a continuation-application of International (PCT) Patent Application No. PCT/CN2019/072774, titled "CELL PHOTOGRAPHING AND CONVEYING APPARATUS", filed on Jan. 23, 2019, which claims foreign priorities of Chinese Patent Application No. 201811160522.2, titled "CELL PHOTOGRAPHING AND CONVEYING APPARATUS" filed on Sep. 30, 2018, the entire contents of which are hereby incorporated by reference.

TECHNICAL FIELD

The present invention relates to a photographing and conveying apparatus, and in particular, to a cell photographing and conveying apparatus.

BACKGROUND

Currently, there are increasingly extensive applications of lithium-ion batteries, such as mobile phones, notebooks, and electric vehicles, which form a huge industry cluster. Cells refer to middle cells in lithium batteries in multiple forms, and can be assembled into batteries of different specifications through a pack operation, for example, lithium batteries for electric bicycles and those for electric cars.

The shells of the cells are composite materials with a relatively soft texture. The cells include a cell body and a Mylar film that covers the cell body. After the cells are produced, many quality issues are reflected in the appearances of the cells. For example, dimensions of the cell body are improper, and the Mylar film on the cells has incorrect dimensions and has an incorrect distribution position on the cell body, and a dent exists on the cell body. In the production process of cells, appearance images of the cells are collected and compared with the appearance of a qualified cell to implement detection. However, an existing photographing apparatus cannot obtain complete appearances of the cells, causing relatively low detection accuracy.

SUMMARY

To overcome the disadvantages in the existing technology, an objective of the present invention is to provide a cell photographing and conveying apparatus, which can acquire a relatively complete appearance image of the cell, thus ensuring detection accuracy.

The objective of the present invention is implemented by using the following technical solution:

A cell photographing and conveying apparatus includes:
  a cell feeding workstation;
  a detection workstation;
  a defective product workstation;
  a container conveying device, where the container conveying device includes a container feeding workstation, a push workstation, a qualified product workstation, a discharge workstation, a first conveying mechanism, a second conveying mechanism, and a push mechanism, where the first conveying mechanism is configured to convey a container from the container feeding workstation to the push workstation; the push mechanism is configured to push the container from the push workstation to the qualified product workstation; and the second conveying mechanism is configured to convey the container from the qualified product workstation to the discharge workstation;
  a manipulator, where the manipulator is configured to transfer a cell from the cell feeding workstation to the detection workstation, and selectively transfer the cell from the detection workstation to the defective product workstation or to the container on the qualified product workstation; and
  an image acquisition device, where the image acquisition device includes at least two ultraviolet lamps, at least two illumination lamps, and at least two cameras, where the at least two ultraviolet lamps are disposed respectively on the upper and lower sides of the detection workstation and are configured to emit ultraviolet light to the detection workstation; the at least two illumination lamps are disposed respectively on the upper and lower sides of the detection workstation; and the at least two cameras are disposed respectively on the upper and lower sides of the detection workstation.

Further, a bearing plate is movably disposed in the container, and a through hole is disposed at the bottom of the container; the cell photographing and conveying apparatus further includes a jacking mechanism, the jacking mechanism includes a lift platform and a lift driving mechanism, and the lift platform is capable of abutting against the bottom of the bearing plate through the through hole; and the lift driving mechanism is configured to drive the lift platform to rise and fall.

Further, the lift driving mechanism includes a lead screw, a lead screw nut, a rotation driving assembly, and a support; the lead screw is mounted on the support, and is capable of rising and falling relative to the support; the lead screw nut is matched with and sleeved on the lead screw, and is pivotally connected to the support; the rotation driving assembly is configured to drive the lead screw nut to rotate; and the top end of the lead screw is fixedly connected to the bottom end of the lift platform.

Further, the cell photographing and conveying apparatus can further include a guiding structure, and the guiding structure includes two guiding members; and the two guiding members are correspondingly disposed relative to the push direction of the push mechanism, a guiding channel is formed between the two guiding members, and the guiding structure is used for the container to pass through.

Further, the manipulator includes an actuating mechanism, a mounting plate, and a pickup unit; the pickup unit includes at least two vacuum suckers; the at least two vacuum suckers are separately mounted on the mounting plate, and can approach or move away from each other; locking structures are correspondingly provided for the vacuum suckers, and the locking structures are configured to fasten the corresponding vacuum suckers to the mounting plate; and the actuating mechanism is configured to drive the mounting plate to move.

Further, the cell photographing and conveying apparatus further includes a conveying and positioning device, and the conveying and positioning device includes a conveying surface, a third conveying mechanism, a first positioning plate, a second positioning plate, and a guiding mechanism; one end of the conveying surface forms a discharge end, and the other end forms a feeding end; the third conveying mechanism is configured to convey the cell from the feeding end to the discharge end; the conveying surface has the cell feeding workstation, and the cell feeding workstation is located between the feeding end and the discharge end; the first positioning plate is disposed at an end, of the cell feeding workstation, that is close to the discharge end; the second positioning plate is disposed on a side of the cell feeding workstation; and the guiding mechanism is configured to guide, to the cell feeding workstation, the cell conveyed by the third conveying mechanism, and guide the cell to a side, of the cell feeding workstation, on which the second positioning plate is disposed.

Further, the push mechanism includes a push member and a linear driving structure, and the push member is configured to push the container; and the linear driving structure is configured to drive the push member to move back and forth between the push workstation and the qualified product workstation.

Further, the first conveying mechanism is a conveyor belt mechanism; the container feeding workstation is formed on one side of the conveyor belt mechanism, and the push workstation is formed on the other side of the conveyor belt mechanism; and the container conveying device further includes a first blocking member, and the first blocking member is configured to prevent the container from keeping moving with the conveyor belt mechanism when being conveyed to the push workstation.

Further, the container conveying device further includes a blocking mechanism, and the blocking mechanism is configured to prevent the container conveyed by the conveyor belt mechanism from entering the push workstation; and the blocking mechanism includes a telescopic cylinder and a second blocking member, and a telescopic rod of the telescopic cylinder is fixedly connected to the second blocking member.

Further, the container conveying device further includes a jack-up mechanism, and the jack-up mechanism is configured to jack up the container at the push workstation.

Compared with the existing technology, the present invention has the following beneficial effect:

In the present invention, the manipulator is used to move the cell to the detection workstation. Then, with coordination between the ultraviolet lamps and the illumination lamps, a Mylar film on the cell can be manifested in a colored state when the ultraviolet lamps irradiate the cell. The illumination lamps provide an adequate light source for photographing by the cameras. As such, the cameras can photograph a relatively complete appearance image of the cell, to facilitate more comprehensive and accurate comparison and judgment, thus making a detection result more accurate.

In addition, the manipulator, the first conveying mechanism, the second conveying mechanism, and the push mechanism coordinate with each other. As such, the manipulator is used to transfer the cell between the cell feeding workstation, the detection workstation, and the defective product workstation. At the same time, the container conveying device is used coordinately to convey the container to the qualified product workstation. In this case, the manipulator transfers the cell, and after the container conveying device conveys the container to the qualified product workstation, can directly transfer a qualified cell into the container for storage. Afterwards, the container conveying device can further convey the container from the qualified product workstation to the discharge workstation, to convey the stored cell. In the previous process, mechanized operations are used to replace manual operations, thereby reducing labor intensity and improving efficiency.

In the figures: 10: cell feeding workstation; 20: detection workstation 30: defective product workstation; 40: image acquisition device; 41: illumination lamp; 42: camera; 43: ultraviolet lamp; 50: manipulator; 51: actuating mechanism; 511: base; 512: first mechanical arm: 513: second mechanical arm; 514: third mechanical arm; 52: mounting plate; 521: adjusting groove; 53: vacuum sucker; 60: container conveying device; 61: first conveying mechanism; 62: second conveying mechanism; 63: push mechanism; 631: push member; 632: linear driving structure; 64: guiding structure; 641: guiding member; 642: guiding channel; 65: first blocking member; 66: blocking mechanism; 661: telescopic cylinder; 662: second blocking member; 67: jack-up mechanism; 671: lift cylinder; 672: jack-up plate; 6721: blocking plate; 70: conveying and positioning device; third conveying mechanism; 72: first positioning plate; 73: second positioning plate; 74: guiding mechanism; 741: guiding surface; 75: first actuating structure; 76: second actuating structure; 80: locking structure; 81: adjusting screw rod; 82: locking nut; 90: jacking mechanism; 91: lift platform; 92: lift driving mechanism; 921: lead screw; 922: lead screw nut; 923: rotation driving assembly; 9231: rotary motor; 9232: driving gear; 9233: driving belt; 9234: transmission gear; 924: support; 925: anti-creep wheel; 9251: ring limiting groove; 926: guiding assembly; 9261: guiding pole; 9262: connecting block; 100: container; 101: bearing plate; 102: through hole; 110: cell.

DESCRIPTION OF EMBODIMENTS

The following further describes the present invention with reference to the accompanying drawings and specific implementations. It should be noted that, the embodiments or technical features described below can be randomly combined to form new embodiments, provided that there is no conflict.

Figure 1:
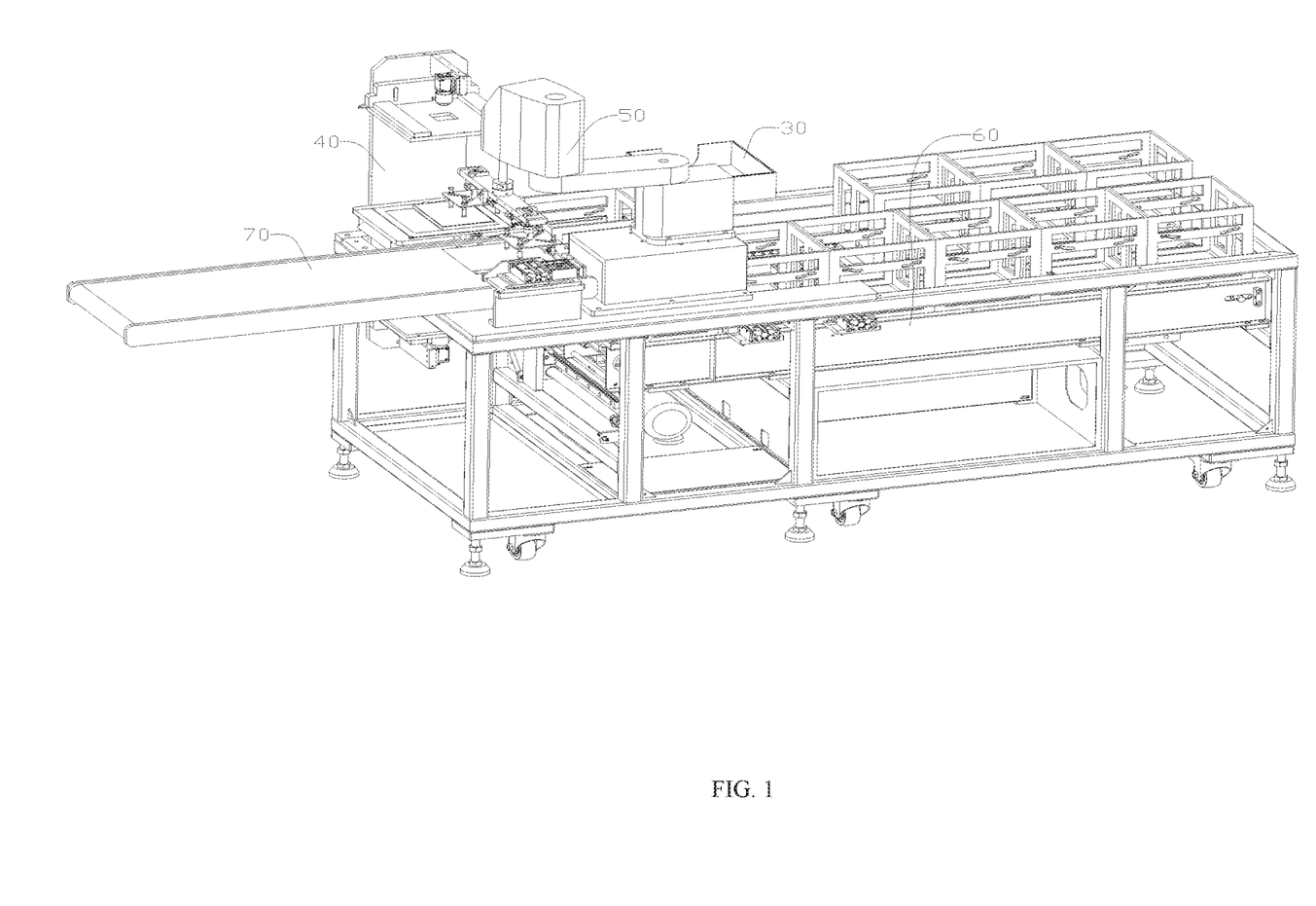
FIG. 1 is a schematic structural diagram of a cell photographing and conveying apparatus according to the present invention.
Figure 2:
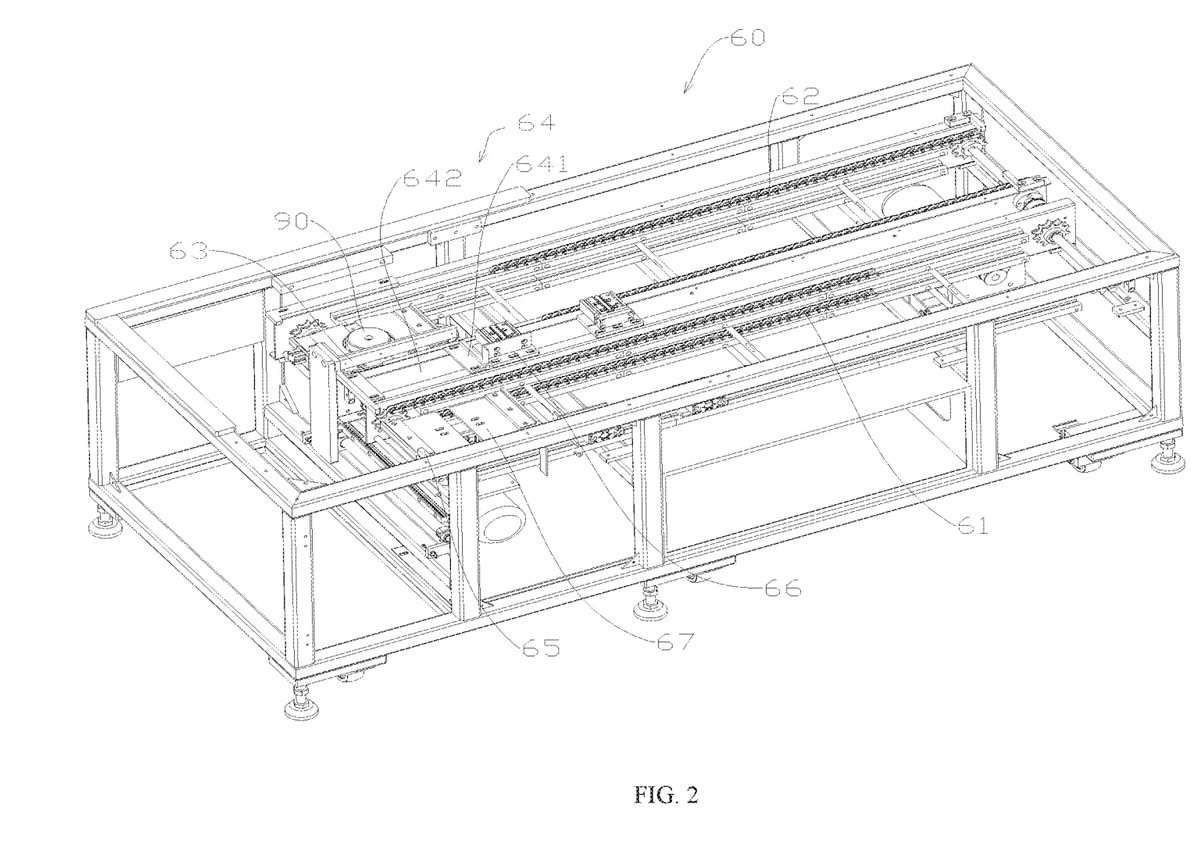
FIG. 2 is a schematic structural diagram of a container conveying device according to the present invention.
Figure 9:
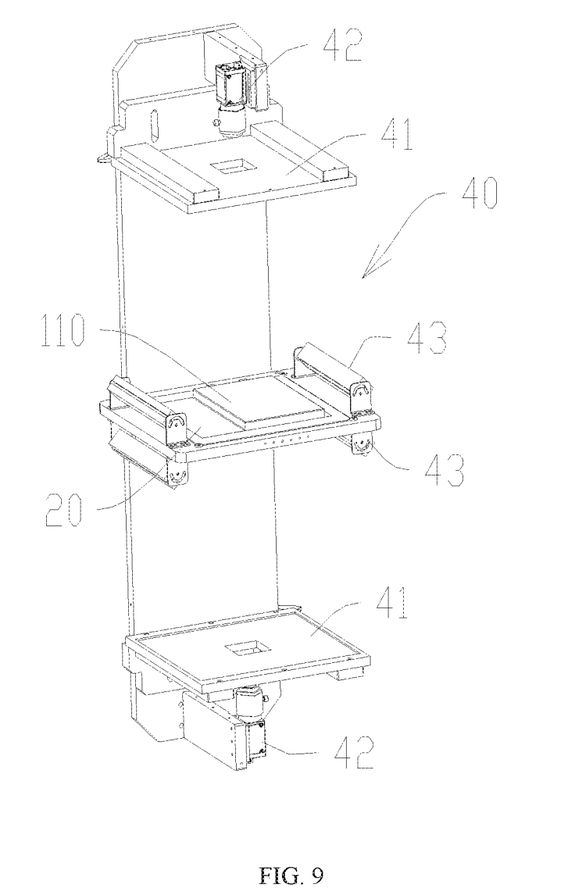
FIG. 9 is a schematic structural diagram of an image acquisition device according to the present invention.

A cell photographing and conveying apparatus shown in FIG. 1, FIG. 2, and FIG. 9 includes a cell feeding workstation 10, a detection workstation 20, a defective product workstation 30, a container conveying device 60, a manipulator 50, and an image acquisition device 40. The container conveying device 60 includes a container feeding workstation, a push workstation, a qualified product workstation, a discharge workstation, a first conveying mechanism 61, a second conveying mechanism 62, and a push mechanism 63. The first conveying mechanism 61 is configured to convey a container 100 from the container feeding workstation to the push workstation. The push mechanism 63 is configured to push the container 100 from the push workstations to the qualified product workstation. The second conveying mechanism 62 is configured to convey the container 100 from the qualified product workstation to the discharge workstation. The manipulator 50 is configured to transfer a cell 110 from the cell feeding workstation 10 to the detection workstation 20, and further selectively transfer the cell 110 from the detection workstation 20 to the defective product workstation 30 or to the container 100 on the qualified product workstation. The image acquisition device 40 includes at least two ultraviolet lamps 43, at least two illumination lamps 41, and at least two cameras 42. The at least two ultraviolet lamps 43 are disposed respectively on the upper and lower sides of the detection workstation 20 and are configured to emit ultraviolet light to the detection workstation 20. The at least two illumination lamps 41 are disposed respectively on the upper and lower sides of the detection workstation, so as to provide light sources on the upper and lower sides of the cell 110. The at least two cameras 42 are disposed respectively on the upper and lower sides of the detection workstation 20, so as to photograph the upper and lower sides of the cell 110.

Based on the previous structure, when the cell photographing and conveying apparatus is used, the first conveying mechanism 61 is used to convey the container 100 from the container feeding workstation to the push workstation. Then, the push mechanism 63 pushes the container 100 from the push workstation to the qualified product workstation. The manipulator 50 is used to transfer the cell 110 from the cell feeding workstation 10 to the detection workstation 20. The ultraviolet lamps 43 and the illumination lamps 41 are turned on. In this case, a Mylar film is manifested in a colored state under irradiation of the ultraviolet lamps 43, for example, the Mylar film is manifested in blue or green, so that the cameras 42 acquire the shape and structure of the Mylar film. Subsequently, the cameras 42 are used coordinately to photograph the upper and lower sides of the cell 110. As such, the cameras 42 can acquire relatively complete images of the cell 110, for example, the appearance and the distribution of the Mylar film, so as to more comprehensively determine whether the overall appearance of the cell 110 is qualified, thereby improving detection accuracy. Afterwards, based on the detection result, the manipulator 50 is used to transfer a qualified cell 110 to the container 100 on the qualified product workstation or an unqualified cell 110 to the defective product workstation 30. Later, the second conveying mechanism 62 transfers the container 100 accommodating the cell 110 to the discharge workstation.

In addition, mechanized operations are used to replace manual operations to transfer, store, and convey the cell 110, thereby reducing labor intensity and improving efficiency.

It should be noted that, a workbench can be disposed, and the cell feeding workstation 10, the detection workstation 20, or the defective product workstation can be formed on the surface of the workbench. The container 100 can be an existing component such as a bucket, a box, or a tray.

The ultraviolet lamp 43 and the illumination lamp 41 on the same side of the detection workstation 20 are successively arranged in the direction away from the detection workstation 20. As such, the ultraviolet lamp 43 is closer to the cell 110 to be detected, thereby avoiding a failure in manifesting the complete Mylar film caused by excessive impact of the illumination lamp 41 on the ultraviolet lamp 43.

After the appearance image of the cell 110 is acquired, comparison can be performed with naked eyes for judgment. To improve judgment accuracy, preferably, the cell photographing and conveying apparatus further includes a computer, and the cameras 42 are configured to send photographed images to the computer. The computer is configured to determine, based on the images, whether the cell 110 is qualified. The computer stores images of a qualified cell 110 and qualification criteria. After obtaining the images acquired by the cameras 42, the computer automatically compares the images with the images of the qualified cell 110, and directly determines, based on the qualification criteria, whether the cell 110 to be detected is qualified. Here, a control device can be further disposed, and the control device is configured to receive a signal from the computer and control movements of the manipulator 50 based on the signal. As such, when the computer sends a signal indicating that the cell 110 is unqualified, the control device controls the manipulator 50 to transfer the cell 110 to the defective product workstation 30, or when the computer sends a signal indicating that the cell 110 is qualified, the control device controls the manipulator 50 to transfer the cell 110 to the qualified product workstation. A person skilled in the art can learn the electrical connection relationships between the computer, the cameras 42, and the control device, the signal transmission principle of the cameras 42, and the working principle of the computer. Details are omitted here for simplicity.

Figure 7:
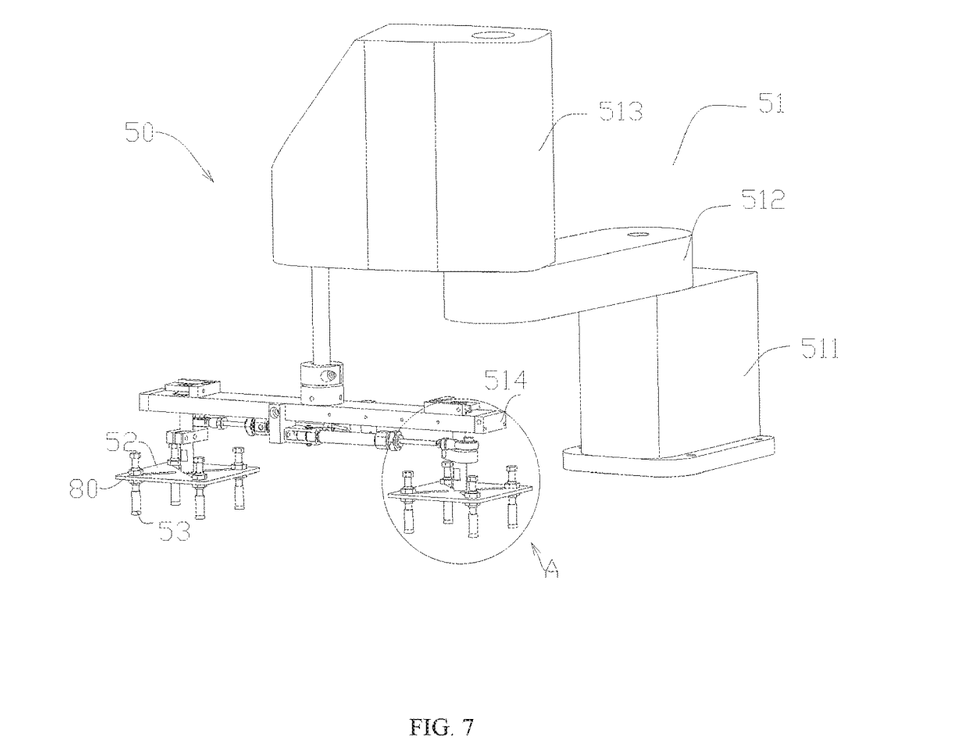
FIG. 7 is a schematic structural diagram of a manipulator according to the present invention.
Figure 8:
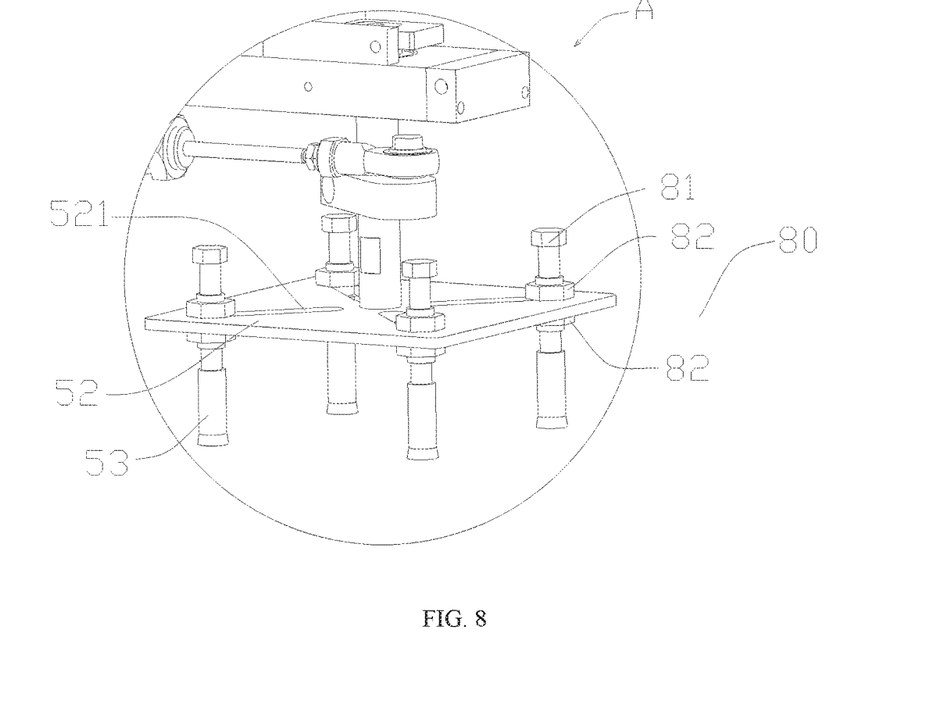
FIG. 8 is an enlarged structural diagram of part A in FIG. 7 according to the present invention.

As shown in FIG. 7 and FIG. 8, further, the manipulator 50 includes an actuating mechanism 51, a mounting plate 52, and a pickup unit. The pickup unit includes at least two vacuum suckers 53. The at least two vacuum suckers 53 are separately mounted on the mounting plate 52, and can approach or move away from each other. It should be noted here that, when in use, the vacuum suckers 53 communicate with an external vacuum pump through hoses, and draw or discharge air by using the external vacuum pump, so that the cell 110 is picked up or released. Locking structures 80 are correspondingly provided for the vacuum suckers 53, and are configured to fasten the corresponding vacuum suckers 53 to the mounting plate 52. The actuating mechanism 51 is configured to drive the mounting plate 52 to move. During use, the distance between the at least two vacuum suckers 53 is adjusted based on the dimensions of the cell 110, so that the at least two vacuum suckers 53 approach or move away from each other. After the at least two vacuum suckers 53 are adjusted to proper positions, the locking structures 80 are used to lock the corresponding vacuum suckers 53 to the mounting plate 52. The actuating mechanism 51 is used to drive the mounting plate 52 to move, and further drive, by linkage, the vacuum suckers 53 to move, so that the vacuum suckers 53 suck the cell 110. Afterwards, when the actuating mechanism 51 transfers the cell 110 to a specified position, the vacuum suckers 53 release the cell 110 to complete the transfer of the cell 110. In the previous process, the vacuum suckers 53 are used to pick up the cell 110. This manner can avoid damage to the structure of the cell 110 in comparison with a clamping manner. In addition, the distance between the at least two vacuum suckers 53 is adjusted to adapt to different dimensions of the cell 110, so that the cell photographing and conveying apparatus features universality.

The locking structures 80 can be implemented in the following manners. In Embodiment 1, the locking structures 80 each include a pin, the vacuum suckers 53 each is provided with a first pin hole, and the mounting plate 52 is provided with multiple second pin holes. As such, the vacuum sucker 53 can be locked by passing the pin through the first pin hole and one of the second pin holes. However, in the previous structure, the first pin hole needs to be provided on the vacuum sucker 53, which easily causes damage to the vacuum sucker 53. In Embodiment 2, the locking structures 80 each include a magnet block fastened to the vacuum sucker 53 and a magnet strip fastened to the mounting plate 52. As such, the vacuum sucker 53 can be locked through mutual attraction between the magnet block and the magnet strip. However, when the previous structure is used for a long time, the magnet block or the magnet strip tends to be demagnetized, and consequently, the vacuum sucker 53 cannot be locked.

Preferably, at least two adjusting grooves 521 that one-to-one correspond to the at least two vacuum suckers 53 are disposed on the mounting plate 52. The locking structures 80 each include an adjusting screw rod 81 and two locking nuts 82. The rod part of the adjusting screw rod 81 movably passes through the corresponding adjusting groove 521 and is fixedly connected to the mounting plate 52. The two locking nuts 82 are placed on the upper and lower sides of the mounting plate 52, and are separately screwed on the rod part of the adjusting screw rod 81. As such, the two locking nuts 82 can be rotated to move away from the mounting plate 52. In this case, the vacuum suckers 53 can move relative to the mounting plate 52. Afterwards, the two locking nuts 82 can be rotated to approach and abut against the mounting plate 52 to coordinately clamp the mounting plate 52. In this case, the vacuum suckers 53 are fastened to the mounting plate 52 under a friction force between the locking nuts 82 and the mounting plate 52. This structure does not need to be provided with pin holes on the vacuum suckers 53, thereby avoiding damage to the vacuum suckers 53, and further avoiding a failure in locking the vacuum suckers 53 caused by an excessively long use time.

Specifically, the at least two adjusting grooves 521 are successively spaced and arranged around the center of the mounting plate 52.

Further, the actuating mechanism 51 includes a base 511, a first mechanical arm 512, a first rotation structure, a second mechanical arm 513, a second rotation structure, a third mechanical arm 514, a third rotation structure, and a lift mechanism. One end of the first mechanical arm 512 is mounted on the base 511, and can rotate on a horizontal plane relative to the base 511. The first rotation structure is configured to drive the first mechanical arm 512 to rotate. One end of the second mechanical arm 513 is mounted on the other end of the first mechanical arm 512, and can rotate on a horizontal plane relative to the first mechanical arm 512. The second rotation structure is mounted on the first mechanical arm 512, and is configured to drive the second mechanical arm 513 to rotate. The third mechanical arm 514 is mounted on the other end of the second mechanical arm 513, and can rotate on a horizontal plane relative to the second mechanical arm 513. The third mechanical arm 514 can further rise or fall relative to the second mechanical arm 513. The third rotation structure is mounted on the second mechanical arm 513, and is configured to drive the third mechanical arm 514 to rotate. The lift mechanism is mounted on the second mechanical arm 513, and is configured to drive the third mechanical arm 514 to rise or fall. The mounting plate 52 is mounted on the third mechanical arm 514.

Based on the previous structure, when in use, a first rotary structure is used to drive the first mechanical arm 512, a second rotary structure is used to drive the second mechanical arm 51:3, and a third rotary structure is used to drive the third mechanical arm 514, so that the mounting plate 52 is driven to rotate, and further the mounting plate 52 drives, by linkage, the vacuum suckers 53 to a position right above the cell 110 to be picked up. Then, the lift mechanism drives the third mechanical arm 514 to fall, so that the vacuum suckers 53 approach and pick up the cell 1110. Through the coordination between the base 511, the first mechanical arm 512, the first rotary structure, the second mechanical arm 513, the second rotary structure, the third mechanical arm 514, and the third rotary structure, the actuating mechanism 51 improves a degree of freedom of a rotation angle to implement multi-angle rotation and more flexible use. In addition, the lift mechanism is coordinately used to ensure that the vacuum suckers 53 can pick up the cell 110.

Specifically, the first rotary structure is a first rotary motor, and an output shaft of the first rotary motor is connected to the first mechanical arm 512 through transmission. The first rotary structure can alternatively be a rotary hydraulic cylinder, a rotary hollow platform, or the like.

Further, the second rotary structure can also be a rotary hydraulic cylinder, a rotary hollow platform, or the like.

Specifically, the lift mechanism is a cylinder, a body of the cylinder is fastened to the second mechanical arm 513, and a telescopic rod of the cylinder is fixedly connected to the third mechanical arm 514. As such, the third mechanical arm 514 is driven to rise or fall through telescoping of the telescopic rod of the cylinder. The lift mechanism can alternatively be a linear motor, or a structure in which a lead screw 921 and a lead screw nut 922 coordinate with each other.

More specifically, the third rotary structure is a second rotary motor, a body of the second rotary motor is fastened to the second mechanical arm 513, and an output shaft of the second rotary motor is fixedly connected to a body of the cylinder. As such, the second rotary motor is used to drive the cylinder to rotate, and further drive, by linkage, the third mechanical arm 514 to rotate. The third rotary structure can alternatively be a rotary hydraulic cylinder, a rotary hollow platform, or the like.

Figure 6:
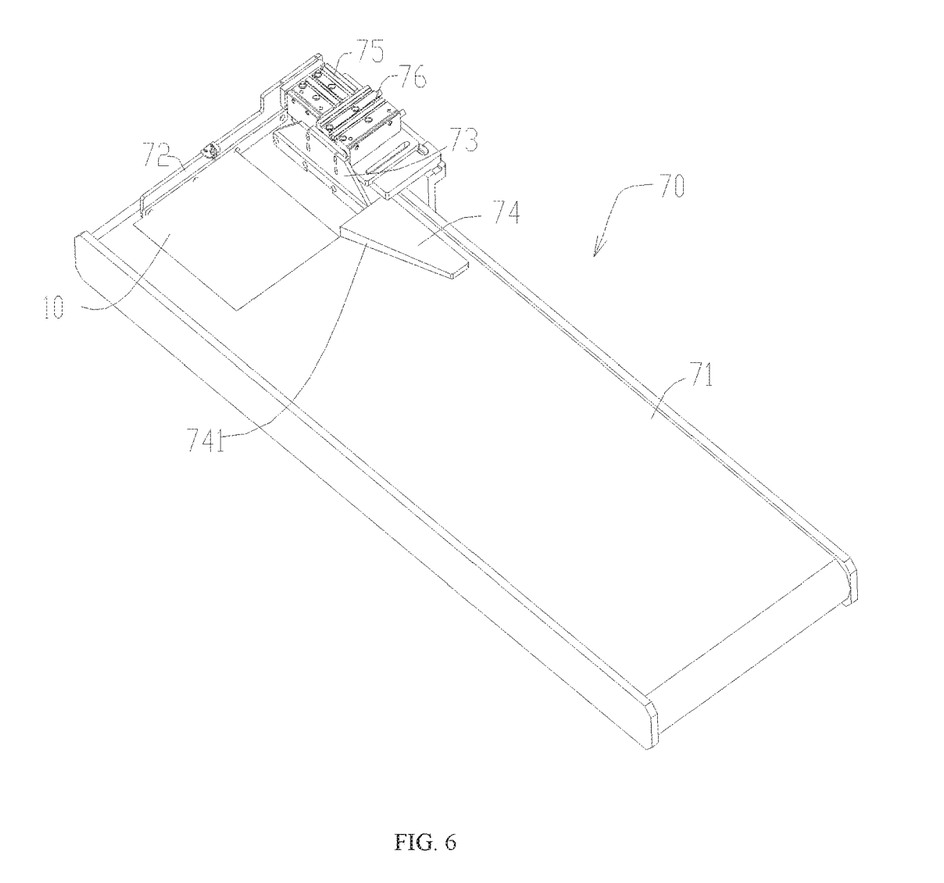
FIG. 6 is a schematic structural diagram of a conveying and positioning device according to the present invention.

As shown in FIG. 1 and FIG. 6, the cell photographing and conveying apparatus further includes a conveying and positioning device 70, and the conveying and positioning device 70 includes a conveying surface, a third conveying mechanism 71, a first positioning plate 72, a second positioning plate 73, and a guiding mechanism 64. One end of the conveying surface forms a discharge end, and the other end forms a feeding end. The third conveying mechanism 71 is configured to convey the cell 110 from the feeding end to the discharge end. The conveying surface has the cell feeding workstation 10, and the cell feeding workstation 10 is located between the feeding end and the discharge end. The first positioning plate 72 is disposed at an end, of the cell feeding workstation 10, that is close to the discharge end. The second positioning plate 73 is disposed on a side of the cell feeding workstation 10. The guiding mechanism 64 is configured to guide, to the cell feeding workstation 10, the cell 110 conveyed by the third conveying mechanism 71, and guide the cell 110 to a side, of the cell feeding workstation 10, on which the second positioning plate 73 is disposed.

Based on the previous structure, when in use, the cell 110 is placed at the feeding end, and the third conveying mechanism 71 conveys the cell 110 to the discharge end. In this case, under the guiding action of the guiding mechanism 74, the cell 110 is guided to the cell feeding workstation 10, and continues to move along with the third conveying mechanism 71 to a position for abutting against the first positioning plate 72, thereby positioning an end of the cell 110. At the same time, the guiding mechanism 74 guides the cell 110 to a side of the cell feeding workstation 10, thereby positioning a side of the cell 110 when the cell 110 abuts against the second positioning plate 73. As such, overall positioning of the cell 110 is completed. This is convenient for subsequent transfer by the manipulator 50, and positioning the cell 110 is also convenient for the image acquisition device 40 to subsequently acquire the appearance of the cell 110.

Specifically, the guiding mechanism 74 includes a guiding plate having a guiding surface 741, and the guiding surface 741 is located on the side, of the cell feeding workstation 10, on which the second positioning plate 73 is disposed. The guiding surface 741 gradually tilts towards the cell feeding workstation 10 from one end close to the feeding end to the other end. As such, the cell 110 is driven by the third conveying mechanism 71 to move to the cell feeding workstation 10 along the guiding surface 741. In addition, because the guiding surface 741 is located on one side of the cell feeding workstation 10, the cell 110 is guided to the cell feeding workstation 10 and one side of the cell feeding workstation 10 at the same time. The previous guiding function can be implemented by using only the guiding plate. This simplifies the structure, and the structure is easy to implement.

The conveying and positioning device 70 for the cell 110 further includes a first actuating structure 75. The first actuating structure 75 is configured to drive the first positioning plate 72 to approach or move away from the cell feeding workstation 10. As such, when the first actuating structure 75 is used to drive the first positioning plate 72 away from the cell feeding workstation 10, the first positioning plate 72 is away from the cell 110, thereby avoiding friction caused by the first positioning plate 72 to the pickup of the cell 110. Similarly, the conveying and positioning device 70 for the cell 110 further includes a second actuating structure 76. The second actuating structure 76 is configured to drive the second positioning plate 73 to approach or move away from the cell feeding workstation 10, thereby avoiding causing friction to the cell 110.

The first actuating structure 75 and the second actuating structure 76 each can be a structure in which the linear motor, the lead screw 921, and the lead screw nut 922 coordinate with each other. An example implementation in this embodiment is as follows: The first actuating structure 75 is a first cylinder, and a telescopic rod of the first cylinder is fixedly connected to the first positioning plate 72. As such, through telescoping of the telescopic rod of the first cylinder, the first positioning plate 72 is driven to move.

Further, the second actuating structure 76 is a second cylinder, and a telescopic rod of the second cylinder is fixedly connected to the second positioning plate 73.

Specifically, the third conveying mechanism 71 can be a conveyor belt mechanism, and the conveyor belt mechanism is an existing structure. A person skilled in the art can learn a specific structure and a working principle of the conveyor belt mechanism. Details are not described herein. The third conveying mechanism 71 can be an existing manipulator or the like.

Figure 3:
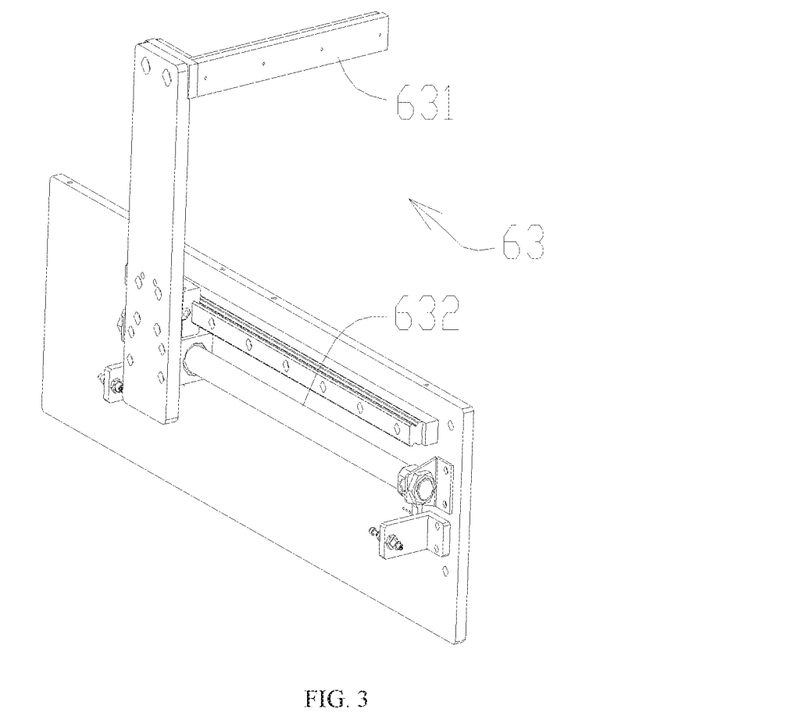
FIG. 3 is a schematic structural diagram of a push mechanism according to the present invention.

The push mechanism 63 can be an existing manipulator. Specifically, as shown in FIG. 3, the push mechanism 63 includes a push member 631 and a linear driving structure 632. The push member 631 is configured to push the container 100. The linear driving structure 632 is configured to drive the push member 631 to move back and forth between the push workstation and the qualified product workstation. As such, the push member 631 is pushed against the container 100. Then, driven by the linear driving structure 632, the push member 631 pushes the container 100, so that the container 100 is conveyed from the push workstation to the qualified product workstation. In the previous process, linear driving can be ensured by using the linear driving structure 632, thereby improving push accuracy.

It should be noted that, the linear driving structure 632 can be a structure in which a linear motor and a cylinder or the lead screw 921 and the lead screw nut 922 coordinate with each other. The linear driving structure 632 can be but is not limited to the previous structure, provided that the push member 631 can be driven to perform linear motion.

As shown in FIG. 2, preferably, the cell photographing and conveying apparatus can further include a guiding structure 64, to avoid position displacement of the container 100 caused by external factors such as mechanical vibration when the push mechanism 63 pushes the container 100. The guiding structure 64 includes two guiding members 641, and the guiding members 641 each can be a guiding pole 9261, a guiding plate, a guiding column, or the like. The two guiding members 641 are correspondingly disposed relative to the push direction of the push mechanism 63, and a guiding channel 642 is formed between the two guiding members 641. The guiding structure 64 is used for the container 100 to pass through. As such, position displacement of the container 100 can be avoided through guiding action of the guiding members 641. The guiding structure 64 can further be the following structure: The guiding structure 64 includes a guiding plate, and a guiding channel 642 is disposed on the guiding plate.

The first conveying mechanism 61 can be an existing manipulator. An example implementation in this embodiment is as follows: The first conveying mechanism 61 is a conveyor belt mechanism. The conveyor belt mechanism is an existing component, and a person skilled in the art can learn a specific structure of the conveyor belt mechanism from the existing technology, and details are omitted here for simplicity. The container feeding workstation is formed on one side of the conveyor belt mechanism, and the push workstation is formed on the other side. As such, continuous conveying can be implemented in comparison with an existing manipulator.

As shown in FIG. 2 to FIG. 5, to prevent the container 100 from keeping moving with the conveyor belt mechanism after the container 100 moves to the push workstation, more preferably, the container conveying device 60 further includes a first blocking member 65. The first blocking member 65 can be a blocking rod, a blocking plate 6721, a blocking block, or the like. The first blocking member 65 is configured to prevent the container 100 from keeping moving with the conveyor belt mechanism after being conveyed to the push workstation. As such, smooth implementation of a subsequent push operation can be ensured.

Figure 4:
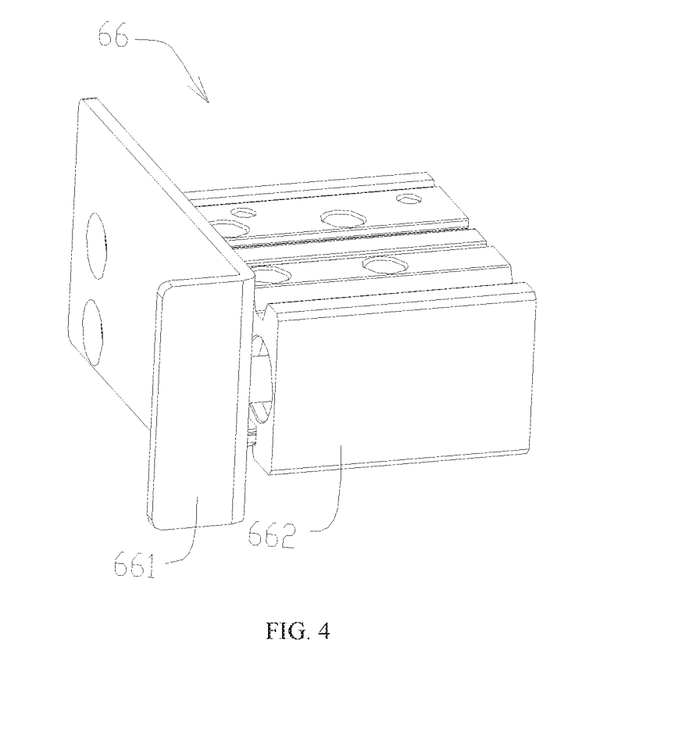
FIG. 4 is a schematic structural diagram of a blocking mechanism according to the present invention.

To prevent a subsequently conveyed container 100 from affecting a push operation of the push mechanism 63, preferably, the container conveying device 60 further includes a blocking mechanism 66. The blocking mechanism 66 is configured to prevent the container 100 conveyed by the conveyor belt mechanism from entering the push workstation. When the container 100 does not need to be conveyed to the push workstation, the blocking mechanism 66 is used to prevent the next container 100 from keeping moving, so as to avoid interfering with the previous container 100. In addition, a subsequent container 100 can further continue to be conveyed towards the direction of the push workstation, thereby improving efficiency.

The blocking mechanism 66 can be implemented in the following manner: In implementation 1, the blocking mechanism 66 includes a telescopic cylinder 661 and a second blocking member 662. The second blocking member 662 can be a blocking rod, a blocking plate 6721, a blocking block, or the like. The telescopic rod of the telescopic cylinder 661 is fixedly connected to the second blocking member 662, As such, the telescoping process of the telescopic rod of the telescopic cylinder 661 can drive the second blocking member 662 to move, so that the second blocking member 662 blocks or releases the container 100.

In implementation 2, the blocking mechanism 66 includes two clamps and an actuating structure that controls the two clamps to approach or move away from each other. As such, the container 100 can be clamped when the two clamps are controlled to approach each other, and can be released when the two clamps are controlled to move away from each other.

Figure 5:
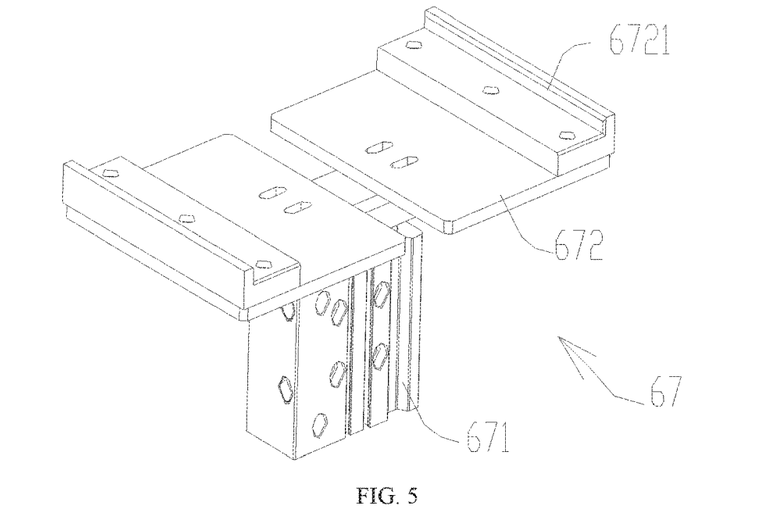
FIG. 5 is a schematic structural diagram of a jack-up mechanism according to the present invention.

In the process of pushing the container 100, the conveyor belt mechanism can continue to remain in a conveying state. In this case, the conveying dynamic of the conveyor belt mechanism generates a push resistance on the container 100 or causes the container 100 to deviate. Therefore, the container conveying device 60 further includes a jack-up mechanism 67, and the jack-up mechanism 67 is configured to jack up the container 100 at the push workstation. In this case, the container 100 at the push workstation can be removed from the conveyor belt mechanism, thereby avoiding impact of the conveyor belt mechanism on the container 100.

As shown in FIG. 2 and FIG. 10 to FIG. 12, furthermore, the jack-up mechanism 67 includes a lift cylinder 671 and a jack-up plate 672. A telescopic rod of the lift cylinder 671 is fixedly connected to the jack-up plate 672. The telescoping of the telescopic rod of the lift cylinder 671 can drive the jack-up plate 672 to rise or fall, thereby jacking up the container 100.

The jack-up mechanism 67 can also be implemented in the following manner: The jack-up mechanism 67 includes a linear motor and a jack-up member.

To limit the container 100 and improve push accuracy, preferably, two opposite sides of the jack-up plate 672 separately extend upward to form blocking plates 6721, and a compartment for accommodating the container 100 is formed between the two blocking plates 6721. The two blocking plates 6721 are correspondingly disposed relative to the push direction of the push mechanism 63. As such, the container 100 is limited between the two blocking plates 6721, which can avoid deviation of the container 100.

Figure 10:
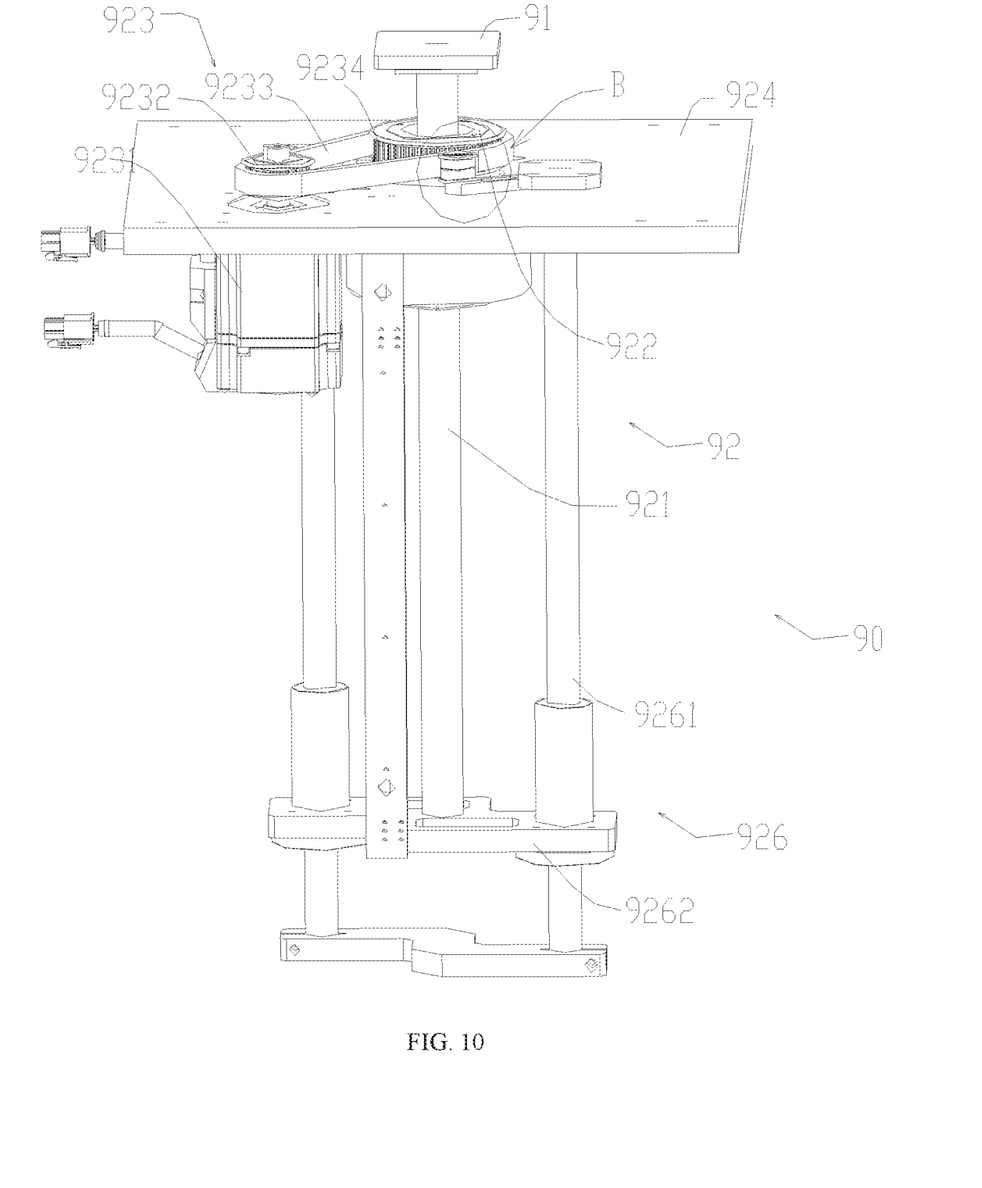
FIG. 10 is a schematic structural diagram of a jacking mechanism according to the present invention.
Figure 12:
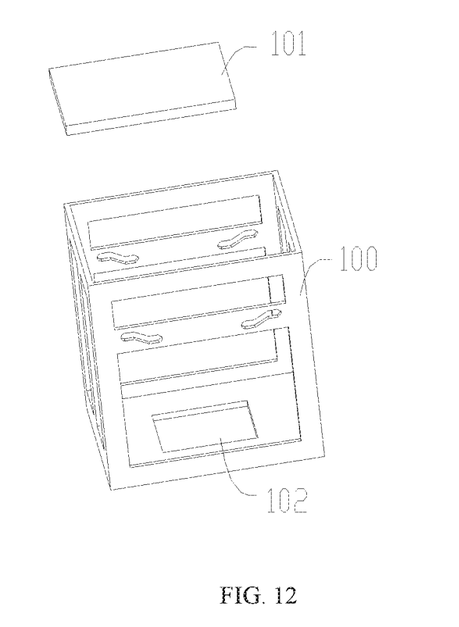
FIG. 12 is a schematic structural diagram of a container.

Preferably, a bearing plate 101 is movably disposed in the container 100, and a through hole 102 is disposed at the bottom of the container 100, to avoid damage to the structure of the cell 110 caused by direct falling of the cell 110 to the bottom of the container 100 resulted from an improper height of the container 100 when the cell 110 is moved into the container 100. The cell photographing and conveying apparatus further includes a jacking mechanism 90. The jacking mechanism 90 includes a lift platform 91 and a lift driving mechanism 92, and the lift platform 91 can abut against the bottom of the bearing plate 101 through the through hole 102. The lift driving mechanism 92 is configured to drive the lift platform 91 to rise or fall. As such, the lift driving mechanism 92 is used to drive the lift platform 91 to rise, and the lift platform 91 can push the bearing plate 101 upward, so that the distance between the cell 110 and the bearing plate 101 is reduced when the cell 110 is moved into the container 100. In addition, when the cell 110 is being gradually moved into the container 110, the lift mechanism is used to drive the lift platform 91 to fall, so that the bearing plate 101 falls along with the lift platform 91 to ensure that the cell 110 is placed in the container 100.

Figure 11:
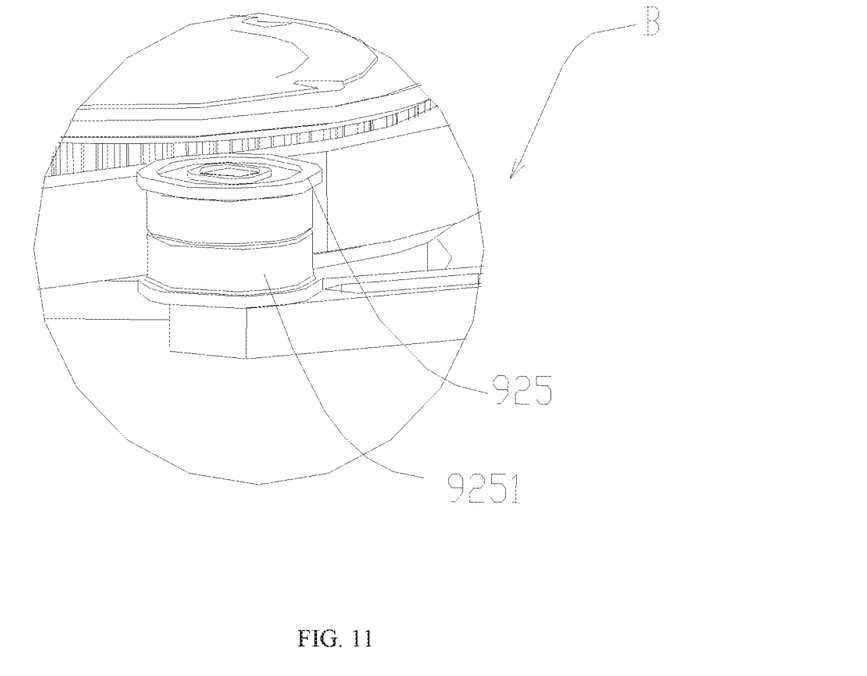
FIG. 11 is an enlarged structural diagram of part B in FIG. 10 according to the present invention.

The lift driving mechanism 92 can be a linear motor or a cylinder. In this embodiment, preferably, the lift driving mechanism 92 includes the lead screw 921, the lead screw nut 922, a rotation driving assembly 923, and a support 924. The lead screw 921 is mounted on the support 924 and can rise or fall relative to the support 924. The lead screw nut 922 is matched with and sleeved on the lead screw 921 and is pivotally connected to the support 924. The lead screw nut 922 can be pivotally connected here by using a bearing or a pivotal shaft. The rotation driving assembly 923 is configured to drive the lead screw nut 922 to rotate. The top end of the lead screw 921 is fixedly connected to the bottom end of the lift platform 91. As such, when the rotation driving assembly 923 drives the lead screw nut 922 to rotate, the lead screw 921 can rise or fall under threaded cooperation with the lead screw nut 922 and a reverse limitation that the lead screw 921 can only rise or fall. That is, the lead screw 921 can drive the lift platform 91 to rise or fall. It should be noted here that, the lead screw 921 can separately rise or fall by adjusting the driving direction of the rotation driving assembly 923. In the previous structure, an overall volume after assembly is reduced and occupied space is reduced without horizontally staggering the lead screw 921 and the lift platform 91.

The rotation driving assembly 923 can be a rotary hydraulic cylinder or a rotary hollow platform. When the rotary hydraulic cylinder is used, an output shaft of the rotary hydraulic cylinder is fixedly connected to the lead screw nut 922, As such, the rotary hydraulic cylinder directly drives the lead screw nut 922 to rotate. However, in this structure, the output shaft of the rotary hydraulic cylinder needs to be disposed coaxially with the lead screw 921, and the mounting is excessively complex. Because mechanical vibration of the rotary hydraulic cylinder is relatively severe, the lead screw nut 922 is caused to vibrate and is damaged.

In this embodiment, the rotation driving assembly 923 is preferably implemented in the following implementation: The rotation driving assembly 923 includes a rotary motor 9231, a driving gear 9232, a driving belt 9233, and a transmission gear 9234. The driving gear 9232 is fixedly sleeved on an output shaft of the rotary motor 9231. The transmission gear 9234 is fastened to the lead screw nut 922. The driving belt 9233 is disposed around the driving gear 9232 and the transmission gear 9234. It can be learned from common knowledge that, in this case, a toothed structure on the driving belt 9233 separately meshes with the driving gear 9232 and the transmission gear 9234 to implement force transmission. As such, when in use, the rotary motor 9231 is started, and the output shaft of the rotary motor 9231 rotates to drive the driving gear 9232 to rotate. In this case, the driving gear 9232 conveys the dynamic to the transmission gear 9234 by using the driving belt 9233, and the transmission gear 9234 is linked to the lead screw nut 922 and further drives the lead screw nut 922 to rotate. In the previous structure, the driving gear 9232, the driving belt 9233, and the transmission gear 9234 coordinate with each other to convey the dynamic of the rotary motor 9231, so as to alleviate impact of mechanical vibration of the rotary motor 9231 on the lead screw nut 922, thereby reducing abrasion. In addition, the output shaft of the rotary motor 9231 needs to be disposed coaxially with an output shaft of the lead screw 921, thereby simplifying the mounting procedure.

Specifically, a body of the rotary motor 9231 is fastened to the support 924.

To avoid detaching the driving belt 9233 from the driving gear 9232 or a driven gear due to vibration during transmission, preferably, the lift driving mechanism 92 further includes an anti-creep wheel 925. The anti-creep wheel 925 is pivotally connected to the support 924 and is provided with a ring limiting groove 9251. The driving belt 9233 is movably mounted in the ring limiting groove 9251 through clamping. As such, in a movement process of the driving belt 9233, the driving belt 9233 moves relative to the limiting groove, and a wall of the limiting groove limits upward and downward movements of the driving belt 9233, thereby avoiding detachment of the driving belt 9233. In addition, the anti-creep wheel 925 is pivotally connected and the limiting groove is a ring. When the driving belt 9233 moves, the anti-creep wheel 925 moves along with the driving belt 9233, so that the friction between the driving belt 9233 and the anti-creep wheel 925 can be reduced. It should be noted here that, the previous ring refers to a structure in which an extension track of the limiting groove is closed at the head and tail, and is not limited to a circle, an ellipse, a square, or the like.

Further, the lift driving mechanism 92 further includes a guiding assembly 926. The guiding assembly 926 includes a guiding pole 9261 and a connecting block 9262. The guiding pole 9261 is arranged vertically and fixed to the support 924. The connecting block 9262 is movably sleeved on the guiding pole 9261, and the connecting block 9262 is fixedly connected to the lead screw nut 922. As such, when the lead screw nut 922 is linked to the lead screw 921, the lead screw 921 can only move vertically due to the limitation of the guiding pole 9261 and the connecting block 9262. In addition, the guiding pole 9261 plays a guiding role, which improves stability of movement of the lead screw 921.

Furthermore, two guiding assemblies 926 can be disposed, and the two guiding assemblies 926 are separately disposed on two opposite sides of the lead screw 921, thereby further improving the stability of the movement of the lead screw 921.

When the lift driving mechanism 92 is used, because the highest position and the lowest position of the lift platform 91 are limited to some extent, the connecting block 9262 is preferably disposed at the bottom end of the lead screw 921 to prevent the lift platform 91 from rising too high or falling too low. The guiding assembly 926 further includes a controller and two sensors.

The two sensors are separately disposed on the upper and lower sides of the lead screw 921 and disposing positions of the sensors. The disposing positions of the sensors are set based on an actual requirement. The sensor is configured to send a signal to the controller when sensing the connecting block 9262. The controller is configured to disable the rotation driving assembly 923 when receiving the signal. As such, when the lead screw 921 moves upward and the sensor located above senses the connecting block 9262 and sends a signal to the controller, the controller disables the rotation driving assembly 923. This prevents the lift platform 91 from rising too high. Similarly, it can be learned that the lower sensor can prevent the lift platform 91 from falling too low. As such, a position to which the lead screw rises or falls can be automatically controlled.

The previous controller can be a PLC controller of an existing model OMRON-CP1L-M40DR-A, OMRON-CJIW-ID201, or OMRON-CPIE-NA20DT1-D. The previous sensor can be a proximity switch of an existing model OMRON-E2E-X7D1-N, a travel switch of an existing model OMRON-D4V-8112Z, a photoelectric switch, an optical grating, or a photoelectric sensor of a model OMRON-E3Z-B67. Working principles and circuit diagrams of the controller and the sensor can be learned from the existing technology, and details are omitted here for simplicity.

The previous implementations are merely example implementations of the present invention, and are not intended to limit the protection scope of the present invention. Any non-substantial change and replacement made by a person skilled in the art on the basis of the present invention falls within the protection scope claimed by the present invention

What is claimed is:

1. A cell photographing and conveying apparatus, comprising:
    a cell feeding workstation;
    a detection workstation;
    a defective product workstation;
    a container conveying device, wherein the container conveying device comprises a container feeding workstation, a push workstation, a qualified product workstation, a discharge workstation, a first conveying mechanism, a second conveying mechanism, and a push mechanism, wherein the first conveying mechanism is configured to convey a container from the container feeding workstation to the push workstation; the push mechanism is configured to push the container from the push workstation to the qualified product workstation; and the second conveying mechanism is configured to convey the container from the qualified product workstation to the discharge workstation;
    a manipulator, wherein the manipulator is configured to transfer a cell from the cell feeding workstation to the detection workstation, and selectively transfer the cell from the detection workstation to the defective product workstation or to the container on the qualified product workstation; and
    an image acquisition device, where the image acquisition device includes at least two ultraviolet lamps, at least two illumination lamps, and at least two cameras, where the at least two ultraviolet lamps are disposed respectively on the upper and lower sides of the detection workstation and are configured to emit ultraviolet light to the detection workstation; the at least two illumination lamps are disposed respectively on the upper and lower sides of the detection workstation; and the at least two cameras are disposed respectively on the upper and lower sides of the detection workstation.

2. The cell photographing and conveying apparatus according to claim 1, wherein a bearing plate is movably disposed in the container, and a through hole is disposed at the bottom of the container; the cell photographing and conveying apparatus further comprises a jacking mechanism, the jacking mechanism comprises a lift platform and a lift driving mechanism, and the lift platform is capable of abutting against the bottom of the bearing plate through the through hole; and the lift driving mechanism is configured to drive the lift platform to rise and fall.

3. The cell photographing and conveying apparatus according to claim 2, wherein the lift driving mechanism comprises a lead screw, a lead screw nut, a rotation driving assembly, and a support; the lead screw is mounted on the support, and is capable of rising and falling relative to the support; the lead screw nut is matched with and provided on the lead screw, and is pivotally connected to the support; the rotation driving assembly is configured to drive the lead screw nut to rotate; and the top end of the lead screw is fixedly connected to the bottom end of the lift platform.

4. The cell photographing and conveying apparatus according to claim 1, wherein the cell photographing and conveying apparatus further comprises a guiding structure, and the guiding structure comprises two guiding members; and the two guiding members are correspondingly disposed relative to the push direction of the push mechanism, a guiding channel is formed between the two guiding members, and the guiding structure is used for the container to pass through.

5. The cell photographing and conveying apparatus according to claim 1, wherein the manipulator comprises an actuating mechanism, a mounting plate, and a pickup unit; the pickup unit comprises at least two vacuum suckers; the at least two vacuum suckers are separately mounted on the mounting plate, and can approach or move away from each other; locking structures are correspondingly provided for the vacuum suckers, and the locking structures are configured to fasten the corresponding vacuum suckers to the mounting plate; and the actuating mechanism is configured to drive the mounting plate to move.

6. The cell photographing and conveying apparatus according to claim 1, wherein the cell photographing and conveying apparatus further comprises a conveying and positioning device, and the conveying and positioning device comprises a conveying surface, a third conveying mechanism, a first positioning plate, a second positioning plate, and a guiding mechanism; one end of the conveying surface forms a discharge end, and the other end forms a feeding end; the third conveying mechanism is configured to convey the cell from the feeding end to the discharge end; the conveying surface has the cell feeding workstation, and the cell feeding workstation is located between the feeding end and the discharge end; the first positioning plate is disposed at an end, of the cell feeding workstation, that is close to the discharge end; the second positioning plate is disposed on a side of the cell feeding workstation; and the guiding mechanism is configured to guide, to the cell feeding workstation, the cell conveyed by the third conveying mechanism, and guide the cell to a side, of the cell feeding workstation, on which the second positioning plate is disposed.

7. The cell photographing and conveying apparatus according to claim 1, wherein the push mechanism comprises a push member and a linear driving structure, and the push member is configured to push the container; and the linear driving structure is configured to drive the push member to move back and forth between the push workstation and the qualified product workstation.

8. The cell photographing and conveying apparatus according to claim 1, wherein the first conveying mechanism is a conveyor belt mechanism; the container feeding workstation is formed on one side of the conveyor belt mechanism, and the push workstation is formed on the other side of the conveyor belt mechanism; and the container conveying device further comprises a first blocking member, and the first blocking member is configured to prevent the container from keeping moving with the conveyor belt mechanism when being conveyed to the push workstation.

9. The cell photographing and conveying apparatus according to claim 8, wherein the container conveying device further comprises a blocking mechanism, and the blocking mechanism is configured to prevent the container conveyed by the conveyor belt mechanism from entering the push workstation; and the blocking mechanism comprises a telescopic cylinder and a second blocking member, and a telescopic rod of the telescopic cylinder is fixedly connected to the second blocking member.

10. The cell photographing and conveying apparatus according to claim 8, wherein the container conveying device further comprises a jack-up mechanism, and the jack-up mechanism is configured to jack up the container at the push workstation.

* * * * *